(12) United States Patent
Mazur

(10) Patent No.: US 7,665,481 B2
(45) Date of Patent: Feb. 23, 2010

(54) PRESSURIZED FLUID LINE SERVICING TOOL

(76) Inventor: Ivan Mazur, 32 Adamic Crescent, Leduc, Alberta, T9E 5H9 (CA)

( * ) Notice: Subject to any disclaimer, the term of this patent is extended or adjusted under 35 U.S.C. 154(b) by 643 days.

(21) Appl. No.: 11/461,849

(22) Filed: Aug. 2, 2006

(65) Prior Publication Data

US 2007/0095397 A1 May 3, 2007

(30) Foreign Application Priority Data

Aug. 2, 2005 (CA) .................................. 2,515,275

(51) Int. Cl.
*F16L 55/18* (2006.01)
(52) U.S. Cl. ..................... 137/15.12; 137/317; 137/271; 138/89
(58) Field of Classification Search ................. 137/317, 137/318, 271, 15.12–15.15; 138/89
See application file for complete search history.

(56) References Cited

U.S. PATENT DOCUMENTS 4,537,071 A * 8/1985 Waterman .................. 73/866.5
5,058,620 A * 10/1991 Jiles ............................ 137/318
5,519,929 A * 5/1996 Bleckman ..................... 29/264
6,892,752 B2 * 5/2005 Burlock et al. .............. 137/317

OTHER PUBLICATIONS

M. E Barber Company, "Products", available at www.mebarberco.com, (select 'Products'), available as early as 2003.
Mueller Company, "Small Drilling Machines", available at www.muellercompany.com/test/mueller_gas/gas,php (select product & services(9)), available as least as early as 2003.

* cited by examiner

Primary Examiner—Kevin L Lee
(74) Attorney, Agent, or Firm—Christensen O'Connor Johnson Kindness PLLC

(57) ABSTRACT

A pressurized fluid line servicing tool assembly consists of a tool insertion adaptor, a cap removal tool and a plug setting tool. The tool insertion adaptor connects to a pipe of a pressurized fluid line and enables tools to be inserted and removed without releasing pressurized fluids, such as natural gas, to atmosphere. It has a tool insertion chamber which is divided into an upstream portion and a downstream portion by a valve. The cap removal tool connects to the tool insertion adaptor to enable service personnel to pass a cap removal wrench through the valve to remove a cap from an end of the pipe of the pressurized fluid line. The plug setting tool connects to the tool insertion adaptor to enable service personnel to pass a torque settable plug through the valve to set a plug into the end of the pipe.

15 Claims, 12 Drawing Sheets

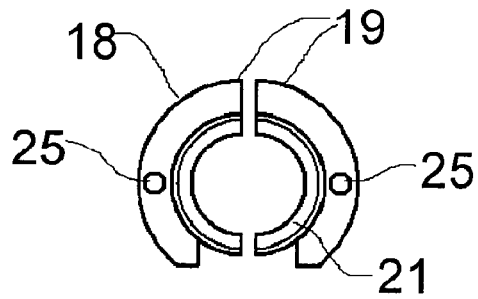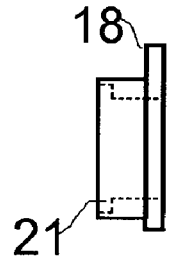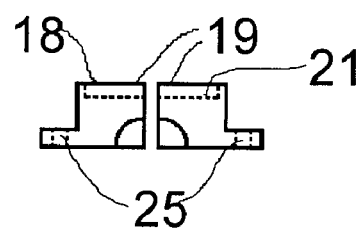
FIG. 5   FIG. 6   FIG. 7
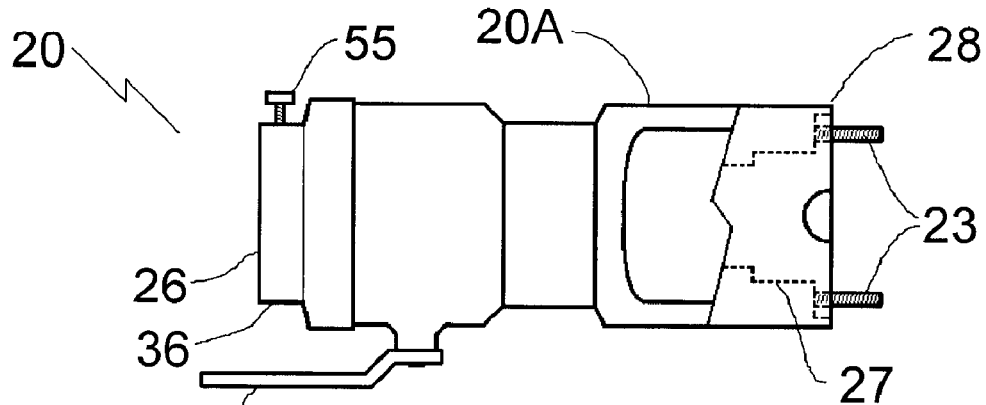
FIG. 8
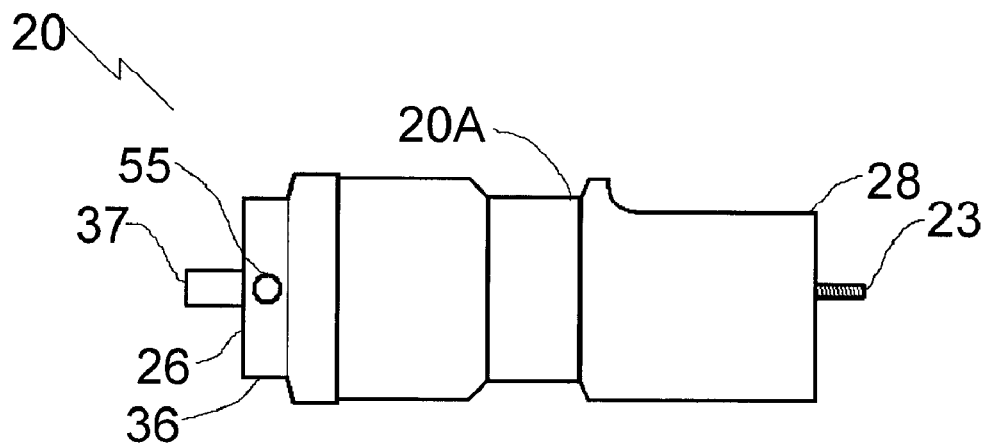
FIG. 9

PRESSURIZED FLUID LINE SERVICING TOOL

FIELD

The present invention relates to a tool that may be used when servicing, stopping or removing service tee connections, changing valves or changing fittings on pressurized fluid lines.

BACKGROUND

Gas company personnel servicing natural gas service tee connections have, in the past, been exposed to natural gas, because there was not a suitable tool available. Other than main line stopping equipment, natural gas service tee connections of the open gut type are viewed as obsolete due to servicing requirements and connected compression style fittings use at the service tee location, and are removed during servicing by service personnel.

SUMMARY

There is provided a pressurized fluid line servicing tool assembly that consists of a tool insertion adaptor, a cap removal tool and a plug setting tool. The tool insertion adaptor connects to a pipe of a pressurized fluid line and enables tools to be inserted and removed without releasing pressurized fluids, such as natural gas, to atmosphere. The tool insertion adaptor has a fluid tight housing with a first end and a second end. The housing has an elongated interior which defines a tool insertion chamber. The tool insertion chamber is divided into an upstream portion and a downstream portion by a valve. The cap removal tool connects to the tool insertion adaptor to enable service personnel to pass a cap removal wrench through the valve to remove a cap from an end of the pipe of the pressurized fluid line. The plug setting tool connects to the tool insertion adaptor to enable service personnel to pass a torque settable plug through the valve to set a plug into the end of the pipe.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 5 is a top plan view of a seal retainer used with a pressurized fluid line servicing tool constructed in accordance with the teachings of the present invention.

FIG. 6 is a side elevation view of the seal retainer illustrated in FIG. 5.

FIG. 7 is a front elevation view of the seal retainer illustrated in FIG. 5.

FIG. 8 is a front elevation view, partially in section, of a seal housing portion of a pressurized fluid line servicing tool constructed in accordance with the teachings of the present invention.

FIG. 9 is a side elevation view of the seal housing illustrated in FIG. 8.

DETAILED DESCRIPTION

The preferred embodiment, a pressurized fluid line servicing tool will now be described with reference to FIG. 1 through 20.

Figure 3:
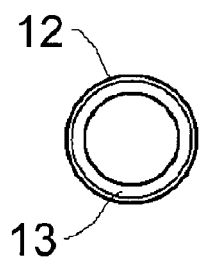
FIG. 3 is a top plan view of one of the seals used with a pressurized fluid line servicing tool constructed in accordance with the teachings of the present invention.
Figure 4:
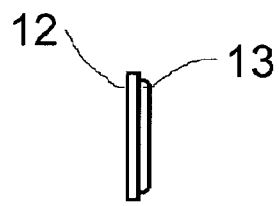
FIG. 4 is a side elevation view of the seal illustrated in FIG. 3.
Figure 11:
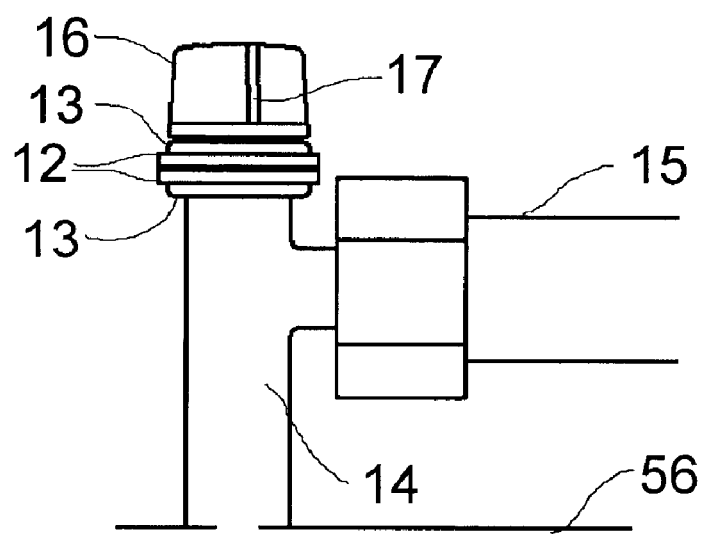
FIG. 11 is a side elevation view of the service tee illustrated in FIG. 10, with seals illustrated FIG. 3-4 in position.
Figure 13:
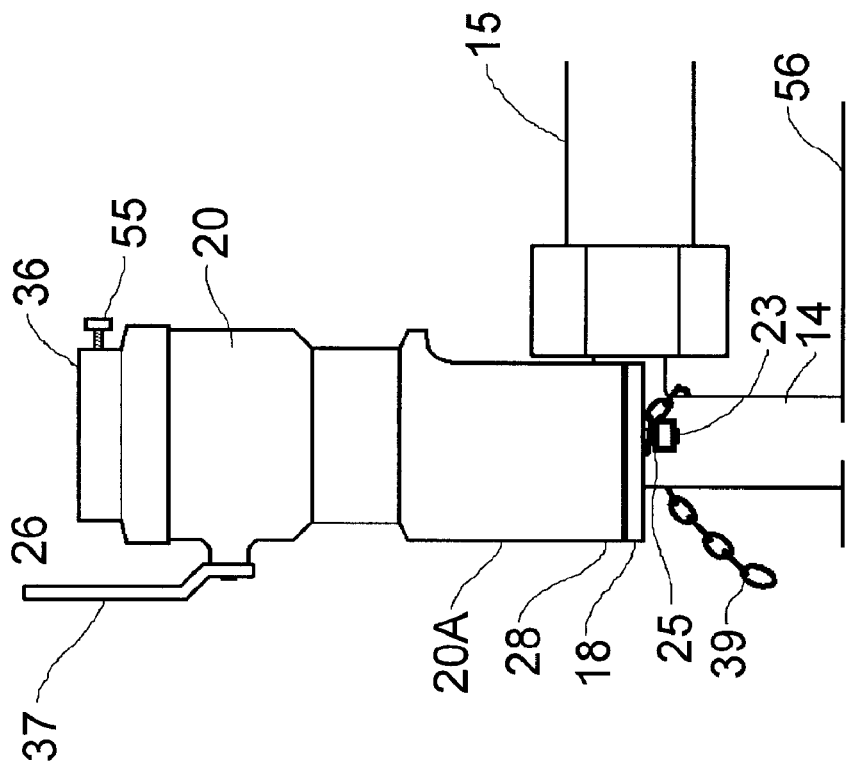
FIG. 13 is a side elevation view of the service tee with seals and seal retainer as illustrated in FIG. 12, with seal housing illustrated in FIG. 8-9 in position.
Figure 12:
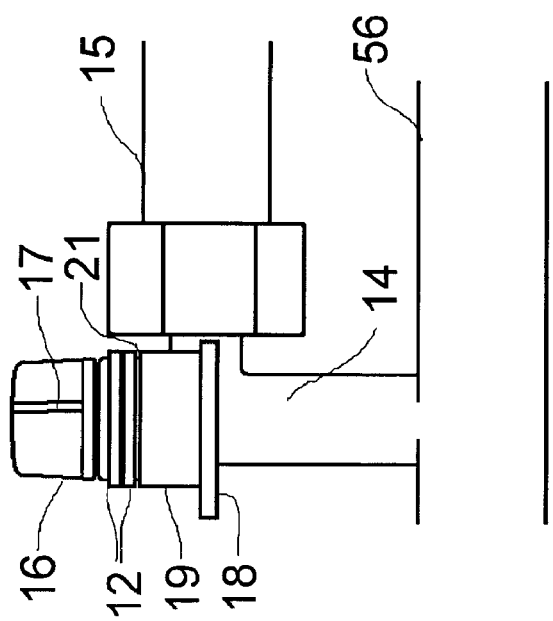
FIG. 12 is a side elevation view of the service tee with seals as illustrated FIG. 11, with seal retainer illustrated in FIG. 5-7 in position.

Structure and Relationship of Parts:

Referring now to FIG. 12, there is shown part of the pressurized fluid line servicing tool, including at least one seal 12 adapted to fit around a pipe, such as a service tee 14, immediately adjacent to an access cap 16 of a service line connection 15, and a seal retainer 18 split into two half collars 19, as shown in FIGS. 5 and 7. Referring to FIG. 12, service line connection 15 is a compression fitting and could be a piece of pipe in other applications. Also, in a preferred embodiment, the invention is used to service a natural gas tee, however, it will be understood that it may also be used for other fluids, such as water or propane. The body of seal retainer 18 has been formed to fit around service line connection 15, and, referring to FIG. 5 through 7, has a seal seat 21 to receive seal 12 that faces seat 21 and seal retainer 18. There is also included a tool insertion adaptor 20 shown in FIGS. 8 and 9, a cap removal tool 22 shown in FIG. 1, and a plug setting tool 24 shown in FIG. 2. Referring to FIG. 11, in the embodiment depicted, two seals 12 are used, positioned in face to face relation, and have bevelled sealing surfaces 13. FIGS. 3 and 4 show seal 12 with bevelled sealing surface 13. Seal 12 may be split or unsplit. Referring to FIG. 13, tool insertion adaptor 20 has a fluid tight seal housing 20A adapted to attach to seal retainer 18 by passing bolts 23 that are fixed to second end 28 through apertures 25 of seal retainer 18 (shown in FIG. 5). This is holds half collars 19 together. Referring to FIG. 8, seal housing 20A has a seal seat 27 to receive the other seal 12 that faces seal housing 20A.

Figure 14:
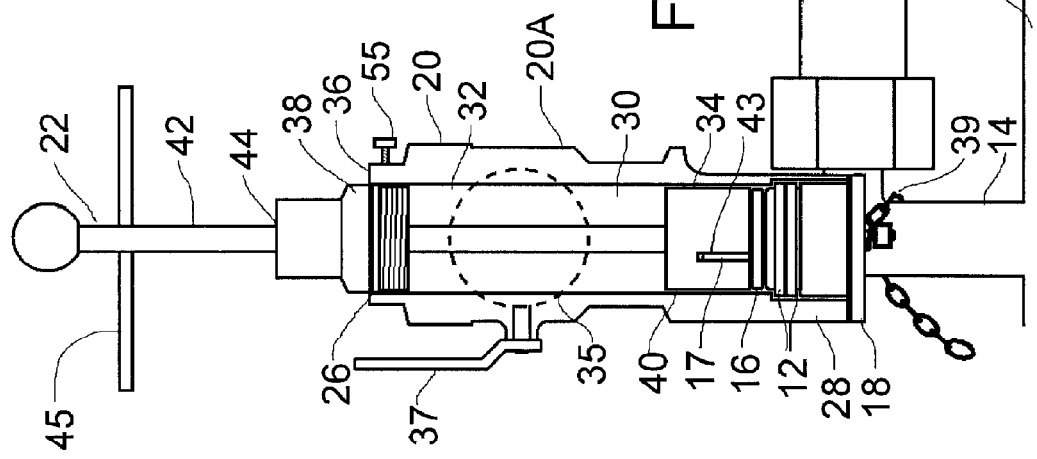
FIG. 14 is a side elevation view of the service tee with seals, seal retainer and seal housing as illustrated in FIG. 13, with cap removal tool illustrated in FIG. 1 in the retracted position.

Referring now to FIG. 14, seal housing 20A has a first end 26 and a second end 28, where second end 28 is adapted to cooperate with seal retainer 18 to form a clamp to apply a compressive force upon seals 12 to bring seals 12 into sealing engagement with service tee 14. First end 26 has an elongated tool insertion chamber 30 divided into an upstream portion 32 and a downstream portion 34 by a valve 35, such as a ball valve, which is opened and closed by handle 37. A bleeder valve 55 allows controlled fluid communication between upstream portion 32 and the environment. A tool to housing coupling 36 is provided at first end 26 of housing 20A. For increased safety, a security chain 39 may be attached to housing 20A to anchor housing 20A to service tee 14. Other restraining devices may also be used instead of security chain 39, such as an adjustable cable or strap.

Figure 1:
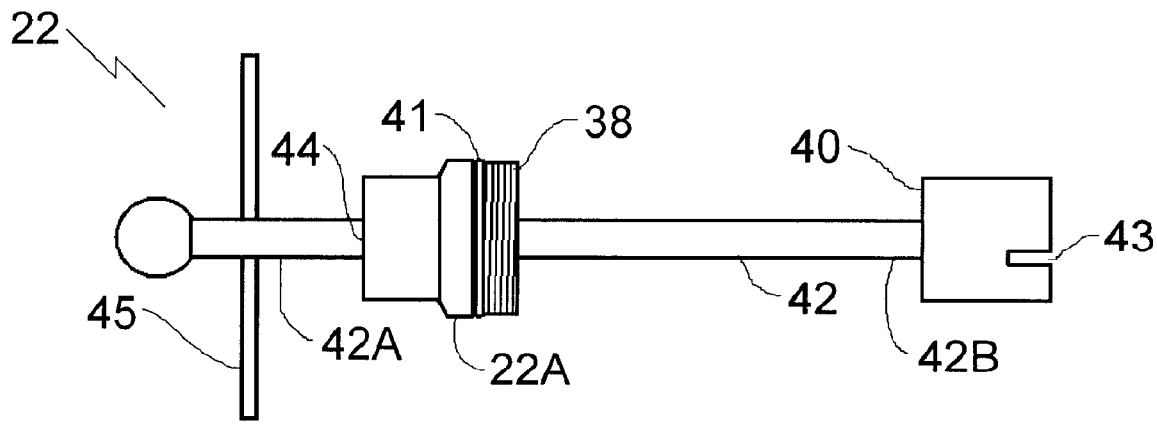
FIG. 1 is a side elevation view of a cap removal tool portion of a pressurized fluid line servicing tool constructed in accordance with the teachings of the present invention.
Figure 15:
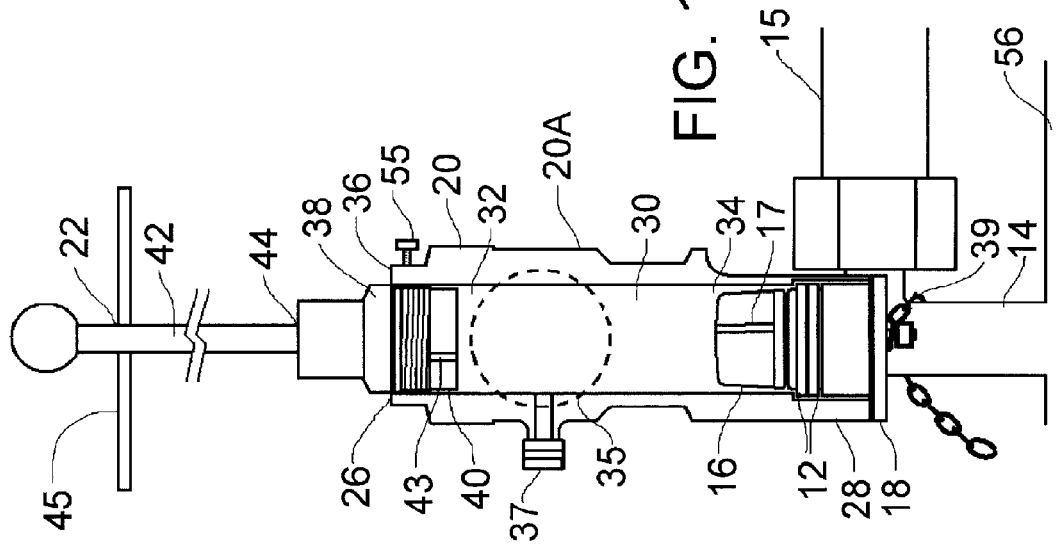
FIG. 15 is a side elevation view of the service tee with seals, seal retainer and seal housing as illustrated in FIG. 13, with cap removal tool illustrated in FIG. 1 in the extended position.
Figure 16:
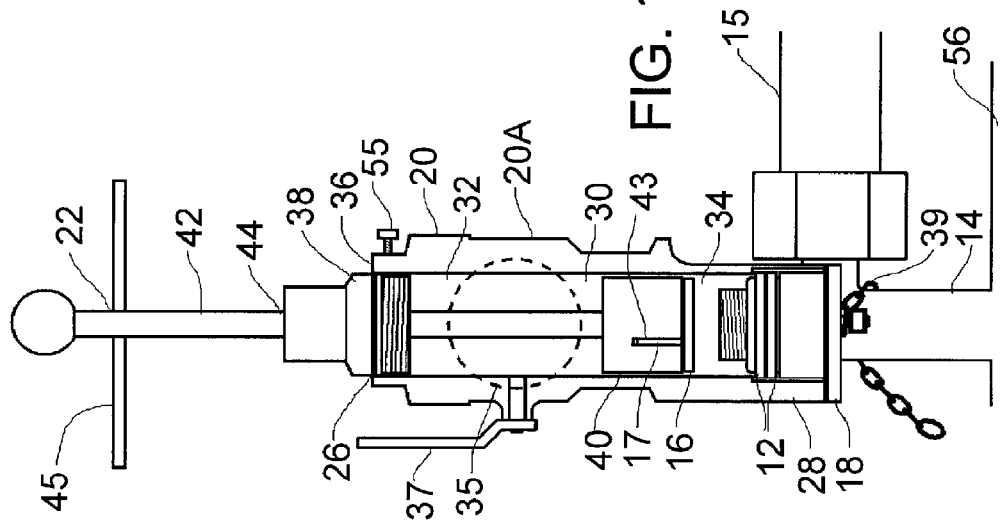
FIG. 16 is a side elevation view of the service tee with seals, seal retainer and seal housing as illustrated in FIG. 13 the cap having been removed from the gas line by the cap removal tool illustrated in FIG. 1.

Referring now to FIG. 1 cap removal tool has a cap removal tool housing 22A having a removal tool to adaptor coupling 38, whereby removal tool 22 is connected to housing coupling 36 of tool insertion adaptor 20 as shown in FIG. 14. Referring again to FIG. 1, a seal 41 is positioned on removal tool to adaptor coupling 38. A shaft 42 is provided having a first end 42A and a second end 42B. Shaft 42 extends through and is axially movable relative to a sealed opening 44 in removal tool housing 22A. A cap removal wrench 43 is secured to second end 42B of shaft 42. A handle 45 is secured to first end 42A of shaft 42. Handle 45 provides means for imparting both axial and rotational movement to 42 shaft, as will hereinafter be further described in relation to operation. Referring to FIG. 14, cap removal wrench 40 is adapted to be inserted into upstream portion 32 of insertion chamber 30 when valve 35 is closed. Referring to FIG. 15, shaft 42 is capable of axial movement to move cap removal wrench 40 into downstream portion 34 of insertion chamber 30 when valve 35 is opened. Referring to FIG. 1, cap removable wrench 40 of cap removal tool 22 has slots 43. Referring to FIG. 16, cap removal wrench 40 engages the cap 16, with slots 43 corresponding to ridges 17 on cap 16 and can then be rotated via shaft to remove a cap 16 from service tee 14. Cap removal wrench 40 is preferably magnetic to assist in retaining cap 16 during removal.

Figure 2:
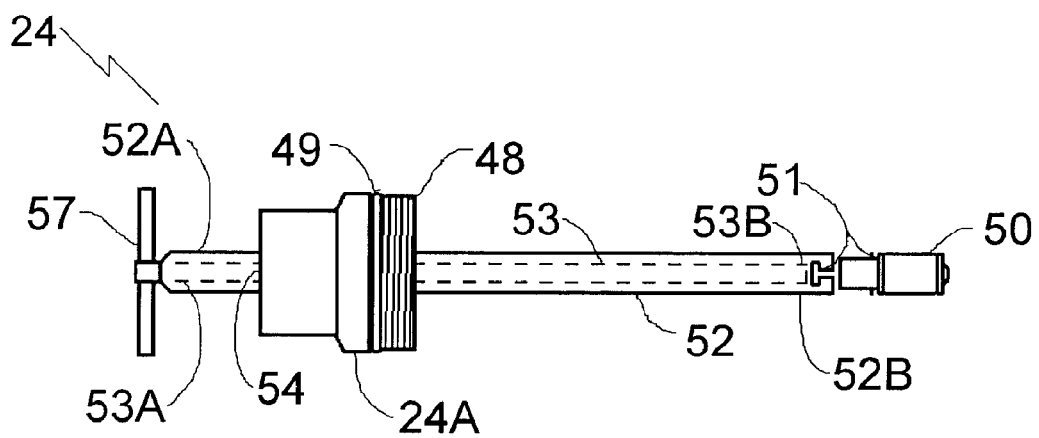
FIG. 2 is a side elevation view of a plug setting tool portion of a pressurized fluid line servicing tool constructed in accordance with the teachings of the present invention.
Figure 17:
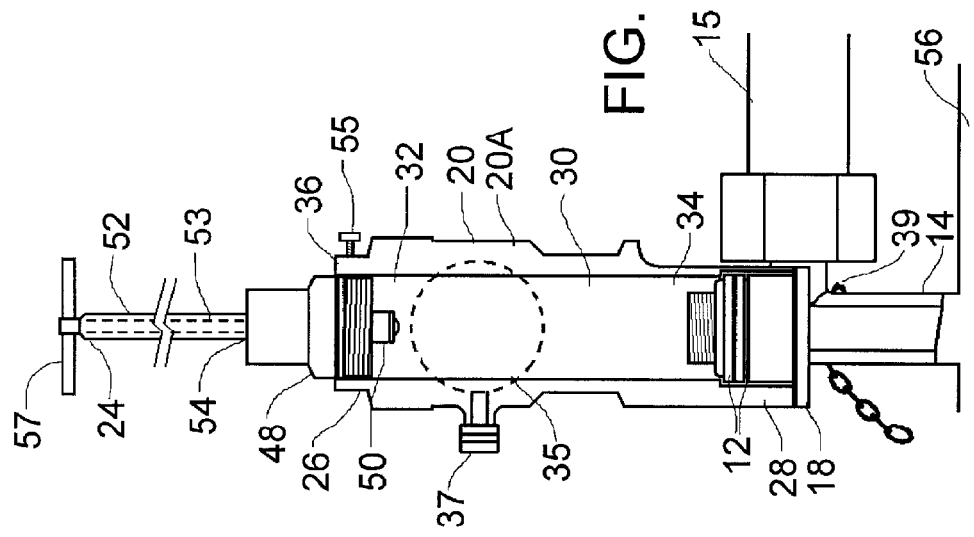
FIG. 17 is a side elevation view of the service tee with seals, seal retainer and seal housing as illustrated in FIG. 13, with plug setting tool illustrated in FIG. 2 in the retracted position.
Figure 19:
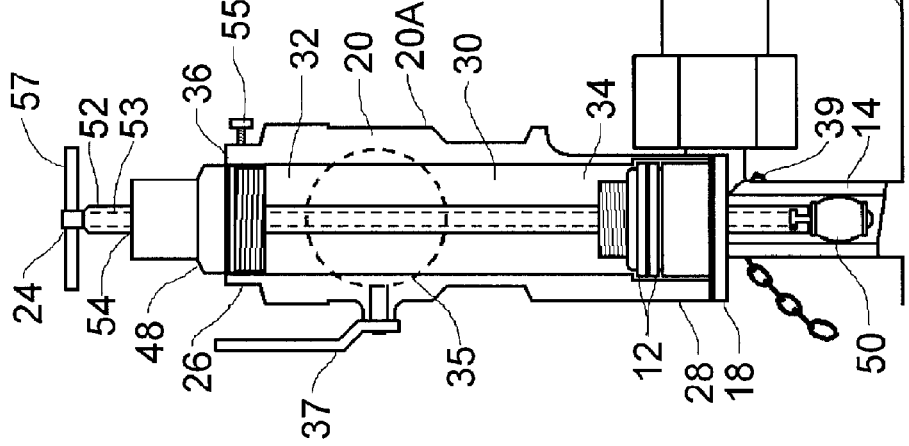
FIG. 19 is a side elevation view of the service tee with seals, seal retainer and seal housing as illustrated in FIG. 13, the plug having been set within the pipe by the plug setting tool illustrated in FIG. 2.
Figure 18:
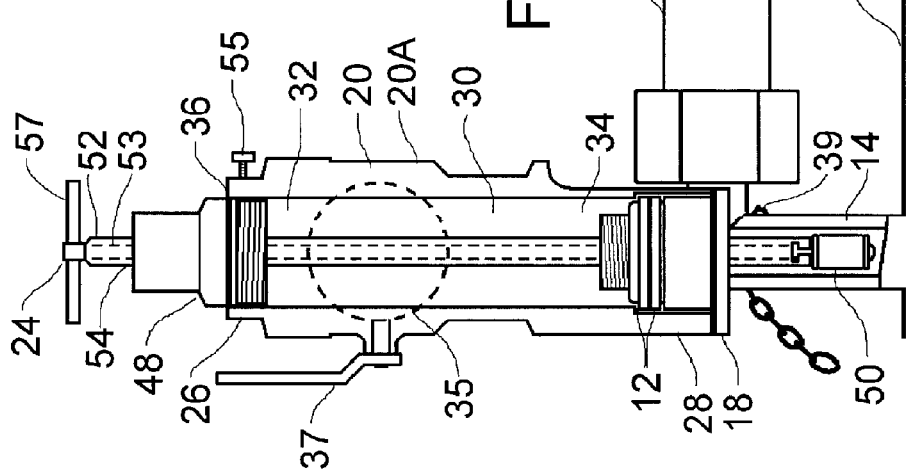
FIG. 18 is a side elevation view of the service tee with seals, seal retainer and seal housing as illustrated in FIG. 13, with plug setting tool illustrated in FIG. 2 in the extended position.

Referring to FIG. 2, plug setting tool 24 has a setting tool housing 24A having a setting tool to adaptor coupling 48, whereby plug setting tool 24 is connected to tool to housing coupling 36 of tool insertion adaptor 20 as shown in FIG. 17. Referring again to FIG. 2, tool to adaptor coupling 48 has a seal 49. An outer shaft 52 is provided having a first end 52A and a second end 52B. Referring to FIG. 17, outer shaft 52 extends through and is axially movable relative to a sealed opening 54 in setting tool housing 24A. Referring to FIG. 2, an inner shaft 53 is provided having a first end 53A and a second end 53B. Inner shaft 53 extends through outer shaft 52 and is rotatable relative to outer shaft 52. A detachable torque settable plug 50 is secured by a pin and slot coupling 51 to second end 52B of outer shaft 52 and secured by a threaded connection to second end 53B of inner shaft 53. A handle 57 is secured to first end 53A of inner shaft 53. Handle 57 provides means for imparting axial movement to both inner shaft 53 and outer shaft 52 and rotational movement to inner shaft 52. Referring to FIG. 17, detachable torque settable plug 50 is adapted to be inserted into upstream portion 32 of insertion chamber 30 when valve 35 is closed. Referring to FIG. 18 shaft 52 is moved axially through sealed opening 54 to move plug 50 through downstream portion 34 of insertion chamber 30 once valve 35 is opened, and into service tee 14 in preparation for setting plug 50 by application of torque via shaft 53, as seen in FIG. 19.

Figure 20:
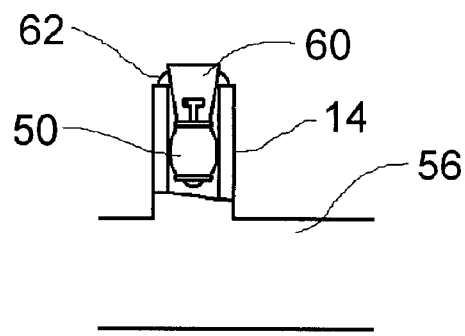
FIG. 20 is a side elevation view, in section, of a completion plug installed in the pipe.

Referring to FIG. 20, a solid, tapered completion plug 20 adapted to attach to plug 50 may also be included to be welded into place if service line connection 15 is to be removed.

Figure 10:
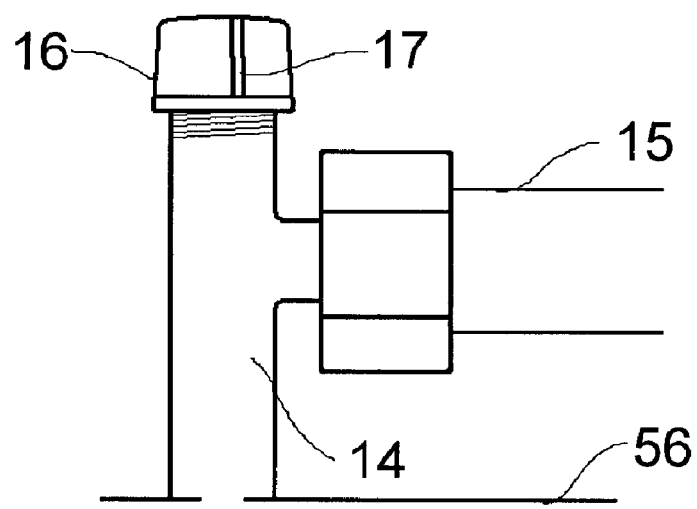
FIG. 10 is a side elevation view of a service tee representing the environment for use of the pressurized fluid line servicing tool.

Operation:

The use and operation of the pressurized fluid line servicing tool will now be discussed with reference to FIGS. 1 through 20 in relation to work on a service tee 14. It will be appreciated that the tool could also be used when changing valves or changing fittings. Referring to FIGS. 1 through 9, the various components are provided as discussed above. Referring to FIG. 10, service line connection 15 to be serviced attached to service tee 14 that has an access cap 16 with ridges 17. Referring to FIG. 11, seals 12 are positioned on service tee 14 between access cap 16 and service line connection 15. This is preferably done by stretching seals 12 over access cap 16. Alternatively, seals 12 may be split on one side to facilitate positioning. Referring to FIG. 12, the two half collars 19 of seal retainer 18 are positioned on each side of service tee 14, and seal 12 is received in seal seat 21. Referring to FIG. 13, seal housing 20A of tool insertion adaptor 20 is attached to seal retainer 18 by passing bolts 23 that are fixed to second end 28 through apertures 25 of seal retainer 18 (shown in FIG. 5) to hold half collars 19 together. Referring to FIG. 8, the seal 12 facing seal housing 20A and half collars 19 are received in seal seat 27. Referring to FIG. 14, once seal housing 20A is secured, cap removal tool 22 can then be attached to seal housing 20A by connecting removal tool to adaptor coupling 38 to tool to housing coupling 36 with valve 35 and bleeder valve 55 both in the closed position. Referring to FIG. 15, valve 35 is then opened and shaft 42 is extended through tool insertion chamber 30 such that removal wrench 40 engages access cap 16 by engaging ridges 17 in slots 43 of removal wrench 40. Referring to FIG. 16, cap 16 is then removed by rotating shaft 42 which in turn rotates removal wrench 40. Shaft 42 is then withdrawn such that removal wrench 40 enters upstream portion 32 of insertion chamber 30, valve 35 is closed while bleeder valve 55 is opened, and cap removal tool 22 can then be safely removed from seal housing 20A. Referring to FIG. 17, plug setting tool 24 is then attached to seal housing 20A by connecting setting tool to adaptor coupling 48 and tool to housing coupling 36 with valve 35 and bleeder valve 55 both closed. Referring to FIG. 18, valve 35 is opened and shaft 52 is then extended through tool insertion chamber 30, such that torque settable plug 50 enters service tee 14 past service line connection 15. Referring to FIG. 19, plug 50 is set by rotating inner shaft 53 while restraining shaft 52 from rotating to expand plug 50, such that service tee 14 is sealed upstream from service line connection 15. Service line connection 15 is then able to be serviced. Plug 50 is removed and access cap 16 is replaced by reversing the above procedure. In some installations, a permanent plug 50 is installed, and portions of service tee 14 are removed, above main line 56 and below service line connection 15. Referring to FIG. 20, if service line connection 15 is removed by cutting service tee 14 above plug 50, completion plug 60 is installed and welded in position as shown by welds 62.

Variations:

After a number of months of field trials of the above described fluid line servicing tool it was determined that modifications were required to each of the tool insertion adaptor, the cap removal tool and the plug setting tool. The modifications, which will hereinafter be further described, and the reasons for those modifications can be summarized as follows:
1. The form of tool insertion adaptor required modification for use with a style of fitting that is in common usage in some regions of North America, known as a Mueller style of fitting. It was determined that it would be best to thread the tool insertion adaptor directly onto the pipe of the pressurized fluid line.
2. The original cap removal tool had a fixed cap removal wrench with a working end that was suited to a particular style of cap. From field experience it was determined that there were a number of types of caps and they would require a number of different configurations of working end. A first modification was to make cap removal wrench detachable from shaft of cap removal tool. This modification enabled cap removal tool to be adapted for use with differ styles by merely changing the cap removal wrench. It also allowed cap removal tool to remove completion plugs, perforators and other devices encountered in the pipe of the pressurized fluid line, by using an appropriate cap removal wrench. Cap removal tool is now considered a "removal tool" as it is capable of removing more than just cans.
3. The outer shaft and the inner shaft of the original plug setting tool were rigid. When pipes were encountered that had a bend, the torque settable plug had to be set before the bend. Pipes with bends were encountered relatively frequently in gas pipes going into houses. Plug setting tool was modified to provide flexibility in the outer shaft and the inner shaft. This enabled the outer shaft and the inner shaft to follow the interior radius of any bend in the pipe, so that torque settable plug could be beyond the bend.

The modifications to the pressurized fluid line servicing tool assembly will now be described with reference to FIG. 21 through 27.

Figure 26:
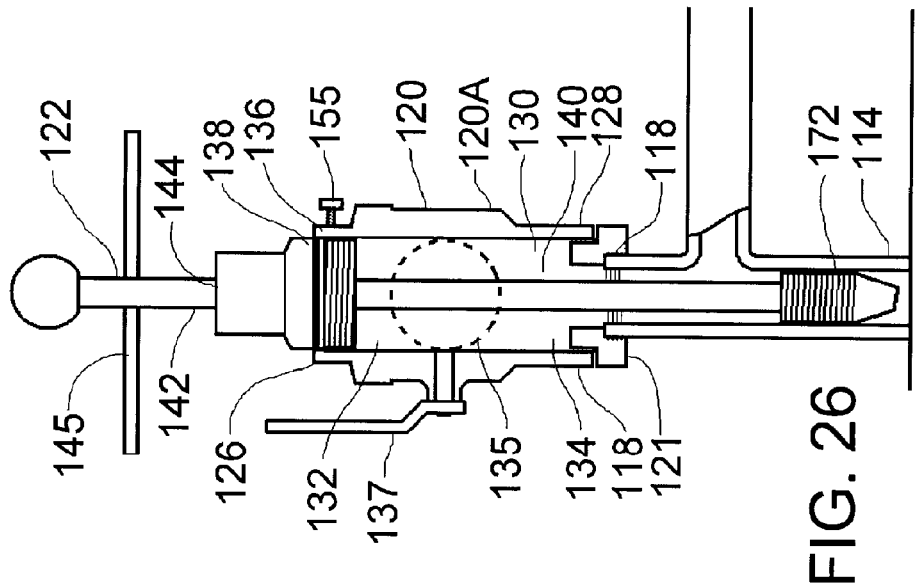
FIG. 26 is a side elevation view, in section, of a modified tool insertion adaptor being used with the modified cap removal tool on a Mueller style fitting to remove a perforator positioned below an end cap.
Figure 25:
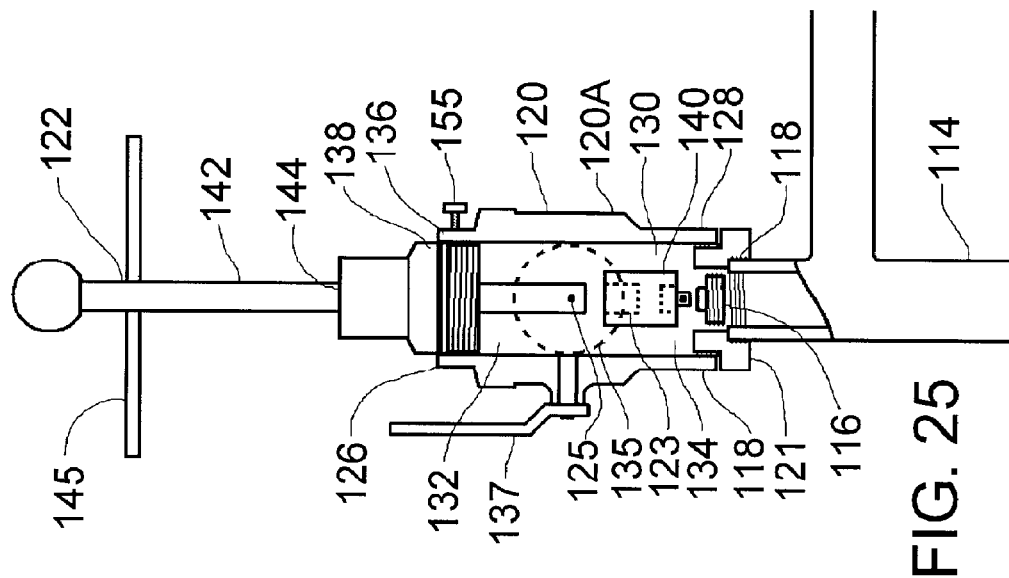
FIG. 25 is a side elevation view, in section, of a modified tool insertion adaptor being used with a modified cap removal tool on a Mueller style fitting to remove an end cap.
Figure 27:
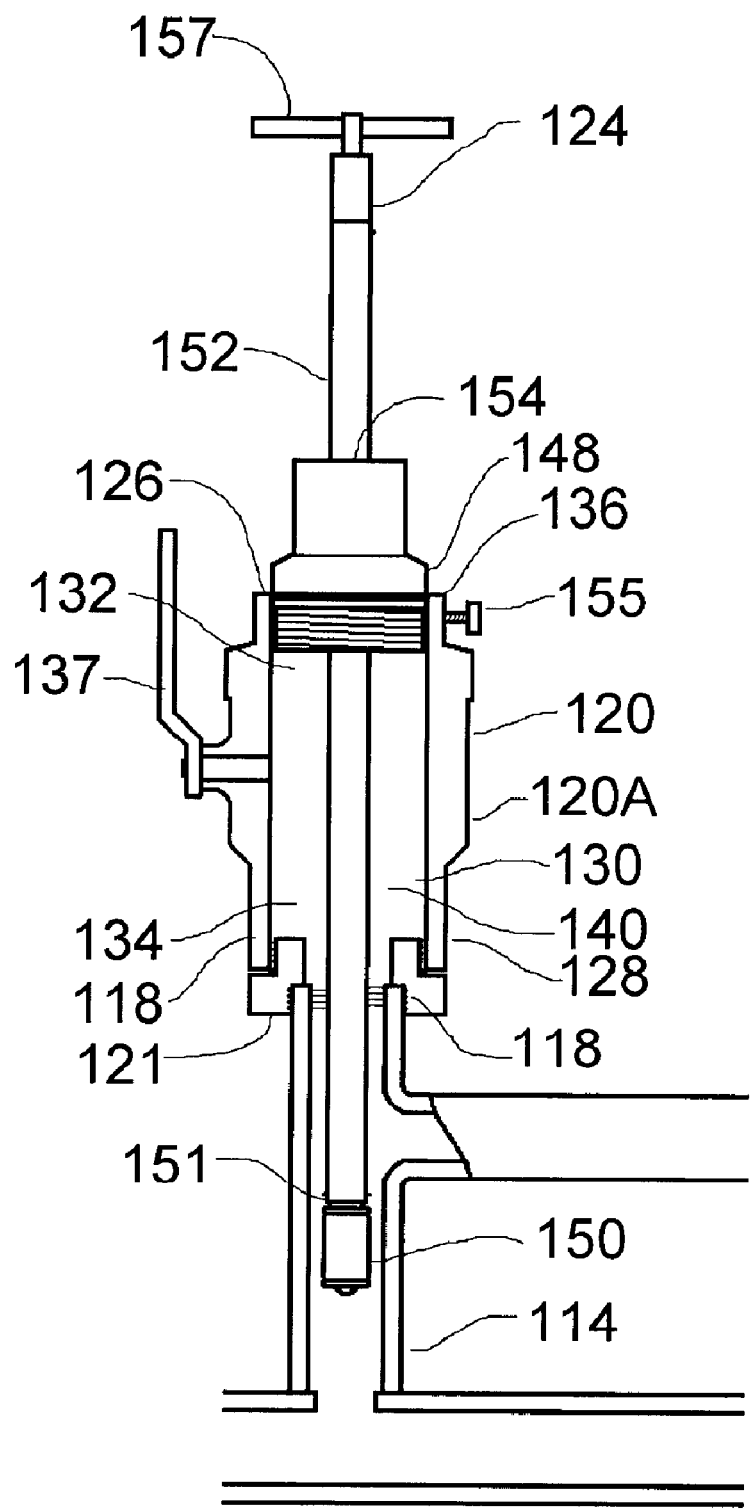
FIG. 27 is a side elevation view, in section, of a modified tool insertion adaptor being used with the modified plug setting tool on a Mueller style fitting to set a torque settable plug.

Structure and Relationship of Parts:

Referring now to FIG. 25 through 27, there is illustrated a tool insertion adaptor 120 that includes a housing 120A having a first end 126 and a second end 128. Housing 120 has an elongated interior tool insertion chamber 130 divided into an upstream portion 132 and a downstream portion 134 by a valve 135, such as a ball valve, which is opened and closed by handle 137. A bleeder valve 155 allows controlled fluid communication between upstream portion 132 and the environment. A tool to housing coupling 136 is provided at first end 126 of housing 120A. In the previously described embodiment of tool insertion adaptor, an extremely elaborate fluid line to housing coupling was provided at the second end of the housing, whereby the housing was coupled to a pipe of a pressurized fluid line. This fluid line to housing coupling included seals and a seal retainer. The housing of the previous embodiment had to cooperate with the seal retainer to exert a compressive force upon the seals. Mueller style fittings allow housing 120A to be threaded directly onto the fitting. The fluid line to housing coupling 118 has, therefore, be simplified in this embodiment and is merely a threaded coupling. As depicted, an adaptor 121 may also be included to allow housing coupling 118 to thread onto different diameters of fittings.

Figure 21:
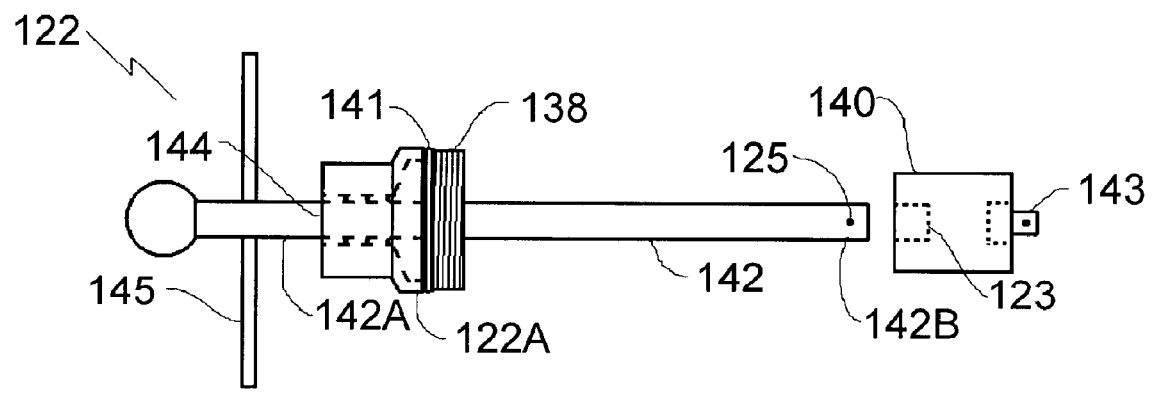
FIG. 21 is a side elevation view of a modified version of cap removal tool having a detachable cap removal wrench.

Referring now to FIG. 21, there is illustrated a removal tool 122 that includes a removal tool housing 122A having a removal tool to adaptor coupling 138, whereby removal tool 122 is connected to tool to housing coupling 136 of tool insertion adaptor 120. A seal 141 is positioned on removal tool to adaptor coupling 138. A shaft 142 is provided having a first end 142A and a second end 142B. Shaft 142 extends through and is axially movable relative to a sealed opening 144 in removal tool housing 122A. A detachable cap removal wrench 140 is shown spaced from second end 142B of shaft 142. A handle 145 is secured to first end 142A of shaft 142. Handle 145 providing means for imparting both axial and rotational movement to 142 shaft, as will hereinafter be further described in relation to operation. In the previous embodiment of cap removal tool, the cap removal wrench was permanently affixed to the end of the shaft. In this embodiment cap removal wrench 140 is detachable. This allows removal tool 122 to be used with different configurations of removal wrenches. It also allows removal tool 122 to be used with removal wrenches that can be used to remove completion plugs, perforators and other devices which service personnel may wish to safely remove without exposing themselves to the pressurized fluids carried by the pressurized fluid line. There are various ways in which removal tools may be attached and detached. In the version illustrated, removal wrench 140 has an internal cavity 123 adapted to overlie and engage second end 142B of shaft 142 of removal tool 122. Second end 142B of shaft 142 preferably has a spring ball lock 125 that assisting in maintaining engagement with internal cavity 123.

Figure 22:
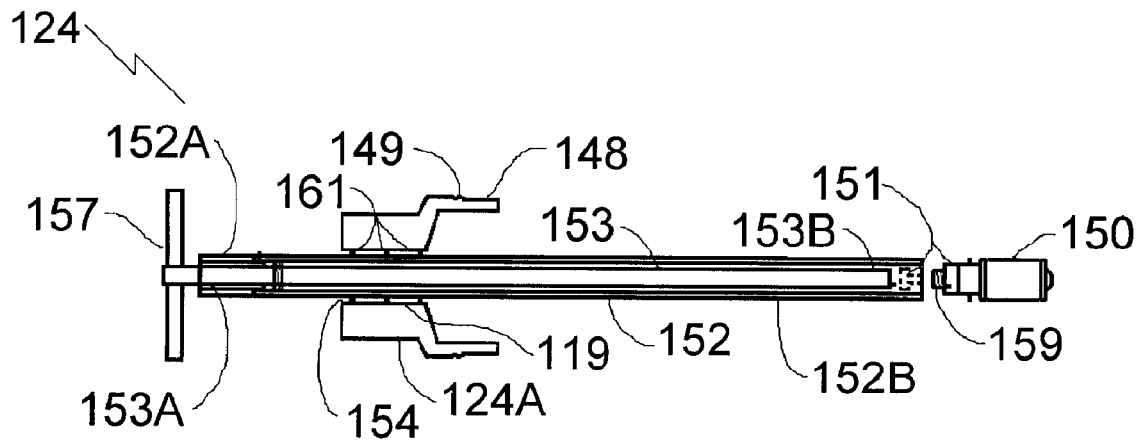
FIG. 22 is a side elevation view, in section, of a modified version of the plug setting tool having improved sealing with a flexible inner shaft and a flexible outer shaft.
Figure 23:
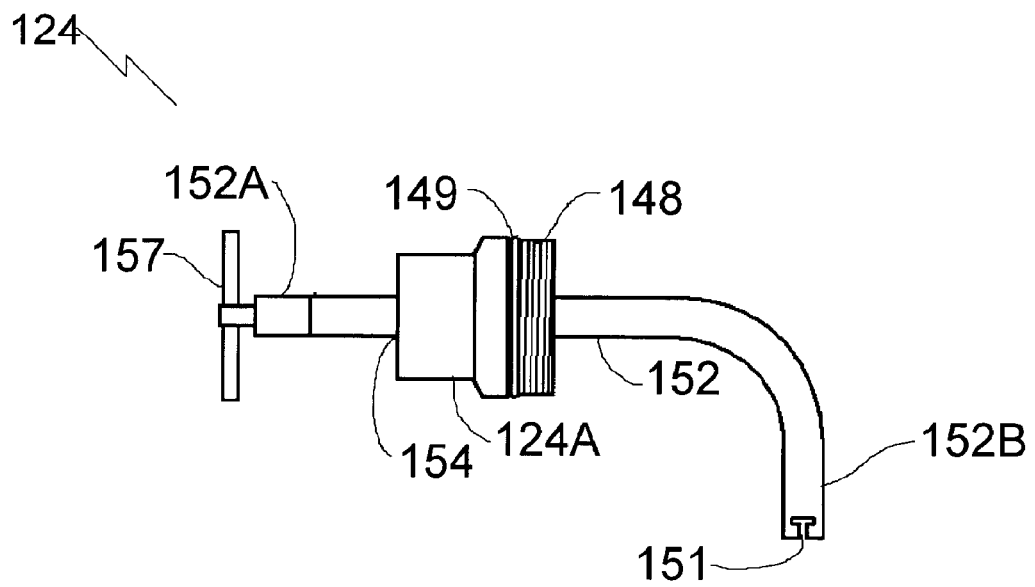
FIG. 23 is a side elevation view of the plug setting tool illustrated in FIG. 22.
Figure 24:
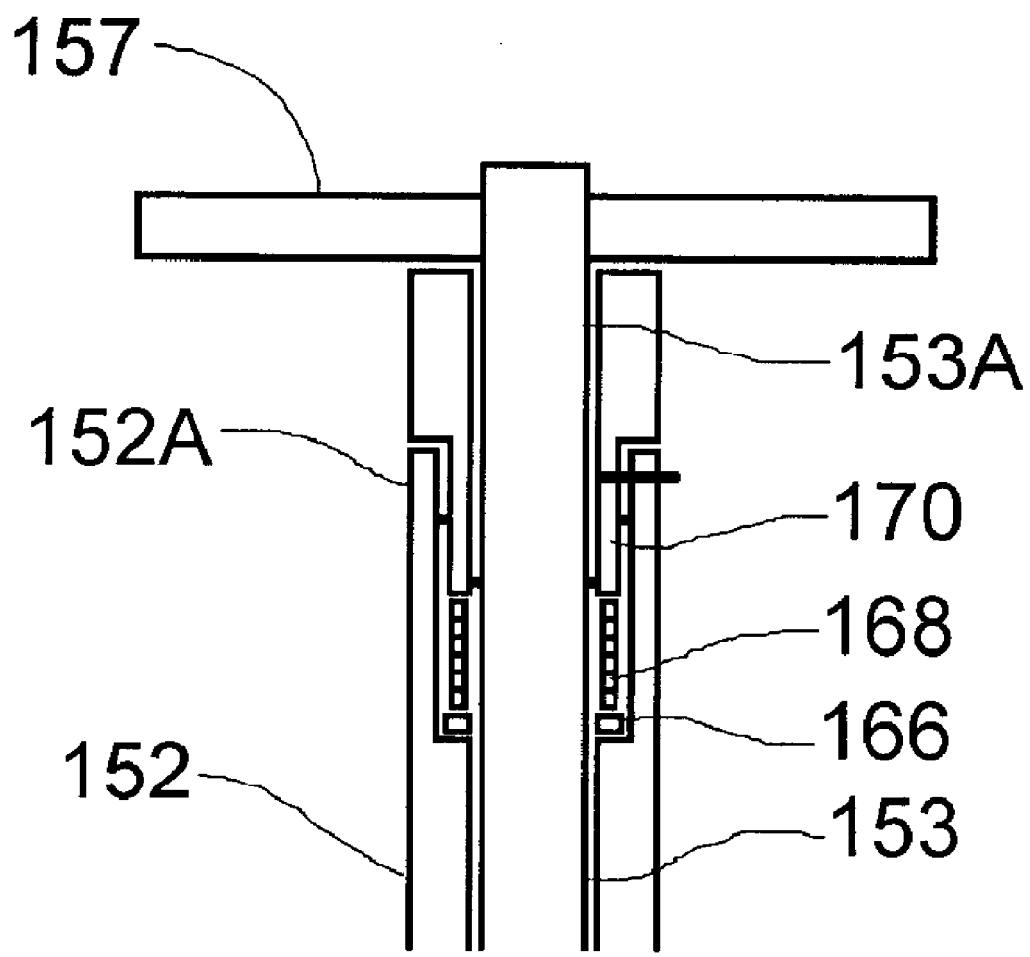
FIG. 24 is a detailed side elevation view, in section, of improved sealing in the plug setting tool illustrated in FIG. 22.

Referring to FIG. 22, plug setting tool 124 includes a setting tool housing 124A having a setting tool to adaptor coupling 148, whereby plug setting tool 124 is connected to tool to housing coupling 136 of tool insertion adaptor 120. Tool to adaptor coupling 148 has a seal 149. An outer shaft 152 is provided having a first end 152A and a second end 152B. Outer shaft 152 extends through and is axially movable relative to a sealed opening 154 in setting tool housing 124A. An inner shaft 153 is provided having a first end 153A and a second end 153B. Inner shaft 153 extends through outer shaft 152 and is rotatable relative to outer shaft 152. A detachable torque settable plug 150 is secured by a pin and slot coupling 151 to second end 152B of outer shaft 152 and secured by a threaded connection 159 to second end 153B of inner shaft 153. A handle 157 is secured to first end 153A of inner shaft 153. Handle 157 provides means for imparting axial movement to both inner shaft 153 and outer shaft 152 and rotational movement to inner shaft 152. In the previously described embodiment, both inner shaft 153 and outer shaft 152 were rigid. Referring to FIG. 23, inner shaft (not shown in this view) and outer shaft 152 are sufficiently flexible to follow an interior radiused bend in the pipe of the pressurized fluid line. This allows torque settable plug 150 to be positioned beyond the radiused bend. Referring to FIG. 22, there is shown an enhanced sealing configuration in which a number of seals 161 are positioned between an interior surface 119 of setting tool housing 124A and outer shaft 152. Referring to FIG. 24, there is also a seal assembly positioned between inner shaft 153 and outer shaft 152. The seal assembly consists of backing ring 166, a series of packing seals 168, and a threaded compression cap that 170 exerts a force to compress packing seals 168 against backing ring 166 to expand outwardly into engagement with inner shaft 153, so that fluids (gas) are unable to migrate up inner shaft 153.

Operation:

The use and operation of the pressurized fluid line servicing tool, as modified, is very similar to operation as previously described with reference to FIGS. 1 through 20. Referring to FIG. 25, seal housing 120A of tool insertion adaptor 120 is attached to Mueller style service tee fitting 114 by fluid line to housing coupling 118. Once seal housing 120A is secured in position, removal tool 122 can then be attached to seal housing 120A by connecting removal tool to adaptor coupling 138 to tool to housing coupling 136 with valve 135 and bleeder valve 155 both in the closed position. Valve 135 is then opened and shaft 142 is extended through tool insertion chamber 130 such that removal wrench 140 engages access cap 116. In the illustrated embodiment access cap 116 has a different configuration and male coupling 143 on removal wrench 140 engages a female coupling 147 of access cap 116. Access cap 116 is removed by rotating shaft 142 which in turn rotates removal wrench 140. Shaft 142 is then withdrawn such that removal wrench 140 enters upstream portion 132 of insertion chamber 130, valve 135 is closed while bleeder valve 155 is opened, and cap removal tool 122 can then be safely removed from seal housing 120A. Referring to FIG. 26, there is illustrated how removal tool 122 can also be used when perforating using a perforator 172 and when removing a perforator 172. If left in place, perforator 172 would otherwise be in the way and would limit the depth to which a plug could be inserted. Referring to FIG. 27, plug setting tool 124 is then attached to seal housing 120A by connecting setting tool to adaptor coupling 148 and tool to housing coupling 136 with valve 135 and bleeder valve 155 both closed. Valve 135 is opened and shaft 152 is then extended through tool insertion chamber 130, such that torque settable plug 150 enters service tee 114 past service line connection 115. Plug 150 is set by rotating inner shaft 153 while restraining shaft 152 from rotating to expand plug 150. Plug 150 is removed and access cap 116 is replaced by reversing the above procedure. In some installations, a permanent plug 150 is installed, and portions of service tee 114 are removed.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A pressurized fluid line servicing tool assembly, comprising in combination:

a tool insertion adaptor, comprising:
a fluid tight housing having a first end and a second end, the housing having an elongated interior defining a tool insertion chamber which is divided into an upstream portion and a downstream portion by a valve;
a tool to housing coupling at the first end of the housing, whereby the housing is coupled to tools; and
a fluid line to housing coupling at the second end of the housing, whereby the housing is coupled to a pipe of a pressurized fluid line;

a removal tool, comprising
a removal tool housing having a removal tool to adaptor coupling, whereby the removal tool is connected to the tool to housing coupling of the tool insertion adaptor;
a shaft having a first end and a second end, the shaft extending through and being axially movable relative to a sealed opening in the removal tool housing,
a removal wrench secured to the second end of the shaft; and
a handle secured to the first end of the shaft, that handle providing means for imparting both axial and rotational movement to the shaft, such that the shaft is moved axially to position the removal wrench into the upstream portion of the tool insertion chamber when the valve is closed, the valve is then opened and the shaft is moved axially to move the removal wrench into the downstream portion of the tool insertion chamber, the shaft is then rotated to remove a cap from the pipe, and then the shaft is moved axially to move the removal wrench and the cap into the upstream portion of the tool insertion chamber so that the valve can be closed to prevent the escape of pressurized fluids from the fluid line;

a plug setting tool, comprising:
a setting tool housing having a setting tool to adaptor coupling whereby the setting tool is connected to the tool to housing coupling of the tool insertion adaptor;
an outer shaft having a first end and a second end, the outer shaft extending through and being axially movable relative to a sealed opening in the setting tool housing;
an inner shaft having a first end and a second end, the inner shaft extending through the outer shaft, the inner shaft being rotatable relative to the outer shaft;
a detachable torque settable plug secured to the second end of the inner shaft; and
a handle secured to the first end of the inner shaft, that handle providing means for imparting axial movement to both the inner shaft and the outer shaft and rotational movement to the inner shaft, such that the outer shaft and inner shaft are moved axially to position the torque settable plug into the upstream portion of the tool insertion chamber when the valve is closed, the valve is then opened and the inner shaft and outer shaft are moved axially to move the torque settable plug through the downstream portion of the tool insertion chamber and into the pipe of the pressurized fluid line, the inner shaft is then rotated to until the torque settable plug is set within the pipe of the pressurized fluid line and the inner shaft is detached from the torque settable plug.

2. The pressurized fluid line servicing tool assembly as defined in claim 1, wherein the fluid line to housing coupling at the second end of the housing of the tool insertion adaptor is comprised of:
at least one seal adapted to fit around a pipe;
a seal retainer, the second end of housing of the tool insertion adaptor being adapted to cooperate with the seal retainer to form a clamp to apply a compressive force upon the at least one seal to bring the at least one seal into sealing engagement with the pipe of the pressurized fluid line.

3. The pressurized fluid line servicing tool assembly as defined in claim 1, wherein the fluid line to housing coupling at the second end of the housing of the tool insertion adaptor is a threaded coupling which engages threads on the pipe of the pressurized fluid line.

4. The pressurized fluid line servicing tool assembly as defined in claim 2, wherein a restraining device is attached to the housing of the tool insertion adaptor, whereby the tool insertion adaptor is anchored to the pipe of the pressurized fluid line.

5. The pressurized fluid line servicing tool assembly as defined in claim 2, wherein two seals are positioned in face to face relation.

6. The pressurized fluid line servicing tool assembly as defined in claim 5, wherein the two seals have bevelled sealing surfaces.

7. The pressurized fluid line servicing tool assembly as defined in claim 2, wherein the seal retainer is split into two half collars.

8. The pressurized fluid line servicing tool assembly as defined in claim 1, wherein the valve is a ball valve.

9. The pressurized fluid line servicing tool assembly as defined in claim 1, wherein the removal wrench is magnetic to assist in retention of the cap.

10. The pressurized fluid line servicing tool assembly as defined in claim 1, wherein the removal wrench is detachable, thereby allowing different configurations of removal wrenches.

11. The pressurized fluid line servicing tool assembly as defined in claim 10, wherein the removal wrench has an internal cavity adapted to overlie and engage the second end of the shaft of the removal tool.

12. The pressurized fluid line servicing tool assembly as defined in claim 1, wherein seals are positioned between an interior surface of the setting tool housing and the outer shaft, and seals are positioned between the inner shaft and the outer shaft.

13. The pressurized fluid line servicing tool assembly as defined in claim 1, further comprising a completion plug for sealing the pipe once the torque settable plug has been set.

14. The pressurized fluid line servicing tool assembly as defined in claim 1, wherein the outer shaft and the inner shaft of the plug setting tool sufficiently flexible to follow an interior radiused bend in the pipe of the pressurized fluid line, thereby allowing the torque settable plug to be positioned beyond the radiused bend.

15. A method of servicing a pressurized fluid line, comprising the steps of:
  providing a tool insertion adaptor, comprising:
    a fluid tight housing having a first end and a second end, the housing having an elongated interior defining a tool insertion chamber which is divided into an upstream portion and a downstream portion by a valve;
    a tool to housing coupling at the first end of the housing, whereby the housing is coupled to tools; and
    a fluid line to housing coupling at the second end of the housing, whereby the housing is coupled to a pipe of a pressurized fluid line;
  using the fluid line to housing coupling to secure the tool insertion adaptor to a pipe of the pressurized fluid line;
  providing a cap removal tool, comprising
    a removal tool housing having a removal tool to adaptor coupling, whereby the removal tool is connected to the tool to housing coupling of the tool insertion adaptor;
    a shaft having a first end and a second end, the shaft extending through and being axially movable relative to a sealed opening in the removal tool housing,
    a cap removal wrench secured to the second end of the shaft; and
    a handle secured to the first end of the shaft, that handle providing means for imparting both axial and rotational movement to the shaft;
  securing the cap removal tool to the tool insertion adaptor by connecting the removal tool to adaptor coupling of the cap removal tool to the tool to housing coupling of the tool insertion adaptor;
  moving the shaft of the cap removal tool axially to position the cap removal wrench into the upstream portion of the tool insertion chamber of the tool insertion adaptor when the valve is closed;
  opening the valve and moving the shaft axially to move the cap removal wrench into the downstream portion of the tool insertion chamber;
  engaging the cap removal wrench with a cap on the pipe of the pressurized fluid line and then rotating the shaft to remove a cap from the pipe;
  moving the shaft axially to position the cap removal wrench and the cap into the upstream portion of the tool insertion chamber and closing the valve to prevent the escape of pressurized fluids from the fluid line;
  detaching the cap removal tool from the tool insertion adaptor;
  providing a plug setting tool, comprising:
    a setting tool housing having a setting tool to adaptor coupling whereby the setting tool is connected to the tool to housing coupling of the tool insertion adaptor;
    an outer shaft having a first end and a second end, the shaft extending through and being axially movable relative to a sealed opening in the setting tool housing;
    an inner shaft having a first end and a second end, the inner shaft extending through the outer shaft, the inner shaft being rotatable relative to the outer shaft;
    a detachable torque settable plug secured to the second end of the inner shaft; and
    a handle secured to the first end of the inner shaft, that handle providing means for imparting axial movement to both the inner shaft and the outer shaft and rotational movement to the inner shaft;
  securing the plug setting tool to the tool insertion adaptor by connecting the setting tool to adaptor coupling of the plug setting tool to the tool to housing coupling of the tool insertion adaptor;
  moving the outer shaft and inner shaft axially to position the torque settable plug into the upstream portion of the tool insertion chamber when the valve is closed;
  opening the valve and moving the inner shaft and outer shaft axially to position the torque settable plug past the downstream portion of the tool insertion chamber and into the pipe of the pressurized fluid line;
  rotating the inner shaft until the torque settable plug is set within the pipe of the pressurized fluid line;
  detaching the inner shaft from the torque settable plug.

* * * * *

UNITED STATES PATENT AND TRADEMARK OFFICE
CERTIFICATE OF CORRECTION

PATENT NO.      : 7,665,481 B2                                      Page 1 of 1
APPLICATION NO. : 11/461849
DATED           : February 23, 2010
INVENTOR(S)     : Ivan Mazur It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Seventh Day of December, 2010

David J. Kappos
*Director of the United States Patent and Trademark Office*